United States Patent Office 3,536,814
Patented Oct. 27, 1970

3,536,814
1-CYCLOALKENYL-4-PHENYL-4-ALKOXYCAR-BONYL-PIPERIDINES AS ANALGESICS
Herbert Merz, Hans-Detlef Schroeder, Adolf Langbein, and Karl Zeile, Ingelheim am Rhein, Germany, assignors to Boehringer Ingelheim G.m.b.H., Ingelheim am Rhein, Germany, a corporation of Germany
No Drawing. Continuation-in-part of application Ser. No. 561,389, June 29, 1966. This application May 22, 1968, Ser. No. 731,336
Claims priority, application Germany, June 29, 1965, B 82,611
Int. Cl. A61k 27/00
U.S. Cl. 424—267        2 Claims

ABSTRACT OF THE DISCLOSURE

The compounds are 1-cycloalkenyl-4-phenyl-4-lower alkoxycarbonyl-piperidines and non-toxic acid addition salts thereof, useful as analgesics in warm-blooded animals.

---

This is a continuation-in-part of copending application Ser. No. 561,389, filed June 29, 1966, now U.S. Pat. 3,438,990.

This invention relates to novel 1-cycloalkenyl-piperidines and acid addition salts thereof, as well as to a process of preparing such compounds.

More particularly, the present invention relates to novel 1 - cycloalkenyl-4-phenyl-4-lower alkoxycarbonyl-piperidines of the formula

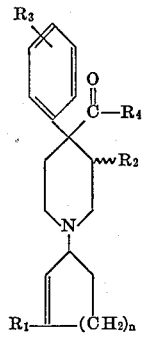

(I)

wherein
$R_1$ is hydrogen, chlorine, or bromine,
$R_2$ is hydrogen, α-methyl or β-methyl,
$R_3$ is m-hydroxyl, p-hydroxyl, m-methoxy or p-methoxy,
$R_4$ is methoxy, ethoxy or propoxy, and
$n$ is an integer from 1 to 4, inclusive, and their non-toxic, pharmacologically acceptable acid additional salts.

The compounds according to the present invention may be prepared by reacting a secondary 4-phenyl-4-lower alkoxycarbonyl-piperidine of the formula

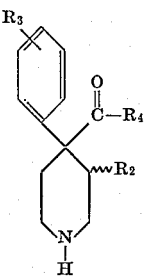

(II)

wherein $R_2$, $R_3$ and $R_4$ have the same meanings as in Formula I, or an acid addition salt thereof, with a cycloalkene compound of the formula

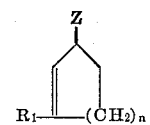

(III)

wherein $R_1$ and $n$ have the same meanings as in Formula I and Z is halogen or p-toluenesulfonyloxy.

The reaction between compounds II and III is preferably carried out in the presence of an inert organic solvent, such as a lower alkanol or a mixture of dimethylformamide and tetrahydrofuran, and in the presence of a weak base at a temperature between 50 and 150° C. The reactants may be employed in a molar ratio of 1:1, but it is preferred if compound III is provided in excess of 1 mol per mol of compound II.

In those instances where $R_3$ in the reaction product of the Formula I is hydroxyl, this hydroxyl group may subsequently be methylated, if desired, by conventional methods; and conversely, if $R_3$ in the reaction product is methoxy, this methoxy substituent may be demethylated by conventional methods.

The compounds of the Formula I are bases and, therefore, form acid addition salts with inorganic and organic acids. Examples of non-toxic, pharmacologically acceptable acid addition salts are those formed with hydrochloric acid, hydrobromic acid, sulfuric acid, phosphoric acid, nitric acid, acetic acid, methanesulfonic acid, tartaric acid, fumaric acid, maleic acid, citric acid, ascorbic acid, caproic acid, propionic acid, 8-chlorotheophylline and the like.

The secondary 4-phenyl-4-lower alkoxycarbonyl-piperidines II required as starting materials for the preparation of the compounds according to the present invention may themselves be prepared by known methods, such as by the processes described in Chemische Berichte 74, 143 (1941); Germany Pat. 679,281; Swiss Pat. 236,312; and U.S. Pat. 3,004,977.

Using these processes, the following starting compounds of the Formula II were prepared:

M.P., ° C.
4-(3-hydroxyphenyl) - 4 - methoxycarbonyl-piperidine·HCl _____ 244
4 - (3 - hydroxyphenyl) - 4 - ethoxycarbonyl-piperidine·HCl _____ 192
4 - (3 - hydroxyphenyl) - 4 - propoxycarbonyl-piperidine·HCl _____ 158
4 - (3 - methoxyphenyl) - 4 - ethoxycarbonyl-piperidine·HCl _____ 163
4 - (4 - hydroxyphenyl) - 4 - ethoxycarbonyl-piperidine·HCl _____ 199
α-3-methyl - 4 - (3 - hydroxyphenyl)-4-methoxycarbonyl-piperidine·HCl _____ 218
β-3-methyl - 4 - (3 - hydroxyphenyl)-4-methoxycarbonyl-piperidine·HCl _____ 212
α-3-methyl - 4 - (3 - hydroxyphenyl)-4-ethoxycarbonyl-piperidine _____ 175–178
β-3-methyl - 4 -( 3 - hydroxyphenyl)-4-ethoxycarbonyl-piperidine _____ 146–149

The following examples further illustrate the present invention and will enable others skilled in the art to understand it more completely. It should be understood, however, that the instant invention is not limited to the particular examples given below.

EXAMPLE 1

Preparation of 1-(3-chloro-2-cyclohexenyl)-4-(3-hydroxyphenyl)-4-methoxycarbonyl-piperidine and its hydrochloride A mixture of 2.72 gm. (0.01 mol) of 4-(3-hydroxyphenyl)-4-methoxycarbonyl-piperidine hydrochloride, 2.1 gm. (0.025 mol) of sodium bicarbonate, 2.1 gm. (0.011 mol) of 1-chloro-3-bromo-cyclohexene, 10 cc. of dimethylformamide and 25 cc. of tetrahydrofuran was refluxed for six hours. Thereafter, the solvent was removed by vacuum distillation, and the residue was extracted with chloroform and water. The aqueous phase was separated and again extracted with chloroform, and the combined chloroform extract solutions were washed with water and dried with sodium sulfate. The chloroform was evaporated, leaving the raw reaction product as a residue. The raw product was dissolved in 20 cc. of chloroform, the solution was filtered through a chromatographic column with 75 gm. of aluminum oxide (neutral aluminum oxide, activity II), and the column was washed with chloroform. The filtrate was evaporated, leaving pure crystalline 1-(3 - chloro - 2 - cyclohexenyl)-4-(3-hydroxyphenyl)-4-methoxycarbonyl-piperidine as a residue.

The residue was dissolved in 20 cc. of ethanol, the solution was acidified with 4 cc. of 2.5 N ethanolic hydrochloric acid, and then ether was added to the solution until it became cloudy. The solution was cooled, the precipitate formed thereby was separated by vacuum filtration, and the filter cake was washed with ether. 2.1 gm. (54% of theory) of a substance having a melting point of 231° C. was obtained; it was identified to be the hydrochloride of 1-(3 - chloro-2-cyclohexenyl)-4-(3-hydroxyphenyl)-4-methoxycarbonyl-piperidine of the formula

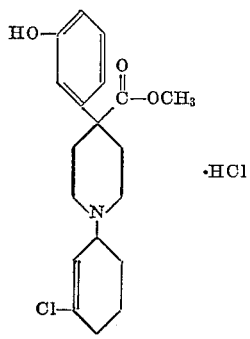

After recrystallization from a mixture of ethanol and ether it had a melting point of 233° C.

EXAMPLE 2

Using a procedure analogous to that described in Example 1, 1-(2-cyclopentenyl) - 4 - (3-hydroxyphenyl)-4-methoxycarbonyl-piperidine and its hydrochloride were prepared from 4-(3-hydroxyphenyl)-4-methoxycarbonyl-piperidine hydrochloride and 1-bromo-cyclopentene-2.

EXAMPLE 3

Using a procedure analogous to that described in Example 1, 1-(2 - cyclopentenyl)-4-(3-hydroxyphenyl)-4-ethoxycarbonyl-piperidine and its hydrochloride were prepared from 4-(3-hydroxyphenyl) - 4 - ethoxycarbonyl-piperidine hydrochloride and 1-bromo-cyclopentene-2.

EXAMPLE 4

Using a procedure analogous to that described in Example 1, 1-(2 - cyclohexyl)-4-(3-hydroxyphenyl)-4-methoxycarbonyl-piperidine and its hydrochloride, M.P. 215° C., were prepared from 4-(3-hydroxyphenyl)-4-methoxycarbonyl-piperidine hydrochloride and 1-bromo-cyclohexene-2. The yield of hydrochloride was 71% of theory.

EXAMPLE 5

Using a procedure analogous to that described in Example 1, 1-(2-cyclohexenyl)-4-(3-hydroxyphenyl)-4-ethoxycarbonyl-piperidine and its hydrochloride, M.P. 209° C., were prepared from 4-(3-hydroxyphenyl)-4-ethoxycarbonyl-piperidine hydrochloride and 1-bromo-cyclohexene-2. The yield of hydrochloride was 78% of theory.

EXAMPLE 6

Using a procedure analogous to that described in Example 1, 1-(2-cyclohexenyl) - 4 - (3-hydroxyphenyl)-4-propoxycarbonyl-piperidine and its hydrochloride, M.P. 216° C., were prepared from 4-(3 - hydroxyphenyl)-4-propoxycarbonyl-piperidine hydrochloride and 1-bromo-cyclohexene-2. The yield of hydrochloride was 74% of theory.

EXAMPLE 7

Using a procedure analogous to that described in Example 1, 1-(2 - cyclohexenyl)-4-(4-hydroxyphenyl)-4-ethoxycarbonyl-piperidine and its hydrochloride, M.P. 187° C., were prepared from 4-(4-hydroxyphenyl)-4-ethoxycarbonyl-piperidine hydrochloride and 1-bromo-cyclohexene-2. The yield of hydrochloride was 41% of theory.

EXAMPLE 8

Using a procedure analogous to that described in Example 1, 1-(2-cyclohexenyl) - 3β - methyl-4-(3-hydroxyphenyl)-4-ethoxycarbonyl-piperidine and its hydrochloride, M.P. 187° C., of the formula

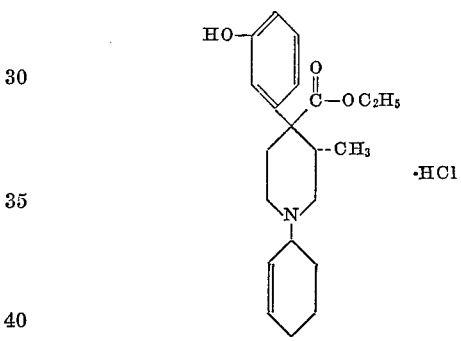

were prepared from 3α - methyl-4-(3-hydroxyphenyl)-4-ethoxycarbonyl-piperidine and 1-bromo-cyclohexene-2. The yield of hydrochloride was 12% of theory.

EXAMPLE 9

Using a procedure analogous to that described in Example 1, 1-(2-cyclohexenyl) - 3β - methyl-4-(3-hydroxyphenyl) - 4 - ethoxycarbonyl-piperidine and its hydrochloride, M.P. 208° C., were prepared from 3β-methyl-4-(3-hydroxyphenyl)-4-ethoxycarbonyl-piperidine and 1-bromo-cyclohexene-2. The yield of hydrochloride was 71% of theory.

EXAMPLE 10

Using a procedure analogous to that described in Example 1, 1-(2-cycloheptenyl) - 4 - (3-hydroxyphenyl)-4-methoxycarbonyl-piperidine and its hydrochloride, M.P. 222° C., were prepared from 4-(3 - hydroxyphenyl)-4-methoxycarbonyl-piperidine hydrochloride and 1-bromo-cycloheptene-2. The yield of hydrochloride was 41% of theory.

EXAMPLE 11

Using a procedure analogous to that described in Example 1, 1-(2-cycloheptenyl) - 4 - (3-hydroxyphenyl)-4-ethoxycarbonyl-piperidine and its hydrochloride, M.P. 222° C., were prepared from 4-(3-hydroxyphenyl)-4-ethoxycarbonyl-piperidine hydrochloride and 1-bromo-cycloheptene-2. The yield of hydrochloride was 40% of theory.

EXAMPLE 12

Using a procedure analogous to that described in Example 1, 1-(2-cyclo-octenyl) - 4 - (3-hydroxyphenyl)-4-methoxycarbonyl-piperidine and its hydrochloride, M.P. 237° C., were prepared from 4-(3-hydroxyphenyl)-4-methoxycarbonyl-piperidine hydrochloride and 1-bromocyclo-octene-2. The yield of hydrochloride was 48% of theory.

EXAMPLE 13

Using a procedure analogous to that described in Example 1, 1-(2-cyclo-octenyl) - 4 - (3-hydroxyphenyl)-4-ethoxycarbonyl-piperidine and its hydrochloride, M.P. 170° C., were prepared from 4-(3-hydroxyphenyl)-4-ethoxycarbonyl-piperidine hydrochloride and 1-bromo-cyclo-octene-2. The yield of hydrochloride was 41% of theory.

EXAMPLE 14

Using a procedure analogous to that described in Example 1, 1-(2-cyclo-octenyl)-4-(4-hydroxyphenyl) - 4-ethoxycarbonyl-piperidine and its hydrochloride, M.P. 229° C., were prepared from 4-(4-hydroxyphenyl)-4-ethoxycarbonyl-piperidine hydrochloride and 1-bromo-cyclo-octene-2. The yield of hydrochloride was 41% of theory.

EXAMPLE 15

Using a procedure analogous to that described in Example 1, 1-(3-chloro-2-cyclopentenyl)-4 - (3 - hydroxyphenyl)-4-methoxycarbonyl-piperidine and its hydrochloride, M.P. 202° C., were prepared from 4-(3-hydroxyphenyl)-4-methoxycarbonyl-piperidine hydrochloride and 1-chloro-3-bromo-cyclopentene. The yield of hydrochloride was 30% of theory.

EXAMPLE 16

Using a procedure analogous to that described in Example 1, 1-(3-chloro-2-cyclopentenyl)-4 - (3 - hydroxyphenyl)-4-ethoxycarbonyl-piperidine and its hydrochloride, M.P. 205° C., were prepared from 4-(3-hydroxyphenyl)-4-ethoxycarbonyl-piperidine hydrochloride and 1-chloro-3-bromo-cyclopentene. The yield of hydrochloride was 18% of theory.

EXAMPLE 17

Using a procedure analogous to that described in Example 1, 1-(3-chloro-2-cyclohexenyl)-4 - (3 - hydroxyphenyl)-4-ethoxycarbonyl-piperidine and its hydrochloride, M.P. 195° C., were prepared from 4-(3-hydroxyphenyl)-4-ethoxycarbonyl-piperidine hydrochloride and 1-chloro-3-bromo-cyclohexene. The yield of hydrochloride was 68% of theory.

EXAMPLE 18

Using a procedure analogous to that described in Example 1, 1-(3-chloro-2-cyclohexenyl)-4 - (3 - hydroxyphenyl)-4-propoxycarbonyl-piperidine and its hydrochloride, M.P. 188° C., were prepared from 4-(3-hydroxyphenyl)-4-propoxycarbonyl-piperidine hydrochloride and 1-chloro-3-bromo-cyclohexene. The yield of hydrochloride was 50% of theory.

EXAMPLE 19

Using a procedure analogous to that described in Example 1, 1-(3-chloro-2-cycloheptenyl)-4 - (3 - hydroxyphenyl)-4-methoxycarbonyl-piperidine and its hydrochloride, M.P. 202° C., of the formula

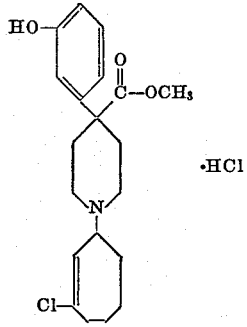

were prepared from 4-(3-hydroxyphenyl)-4-methoxycarbonyl-piperidine hydrochloride and 1-chloro-3 - bromo-cycloheptene. The yield of hydrochloride was 50% of theory.

EXAMPLE 20

Using a procedure analogous to that described in Example 1, 1-(3-chloro-2-cycloheptenyl)-4 - (3 - hydroxyphenyl)-4-ethoxycarbonyl-piperidine and its hydrochloride, M.P. 228° C., were prepared from 4-(3-hydroxyphenyl)-4-ethoxycarbonyl-piperidine hydrochloride and 1-chloro-3-bromo-cycloheptene. The yield of hydrochloride was 41% of theory.

EXAMPLE 21

Using a procedure analogous to that described in Example 1, 1-(3-chloro-2-cycloheptenyl)-4 - (3 - hydroxyphenyl)-4-propoxycarbonyl-piperidine and its hydrochloride, M.P. 214° C., were prepared from 4-(3-hydroxyphenyl)-4-propoxycarbonyl-piperidine hydrochloride and 1-chloro-3-bromo-cycloheptene. The yield of hydrochloride was 40% of theory.

EXAMPLE 22

Using a procedure analogous to that described in Example 1, 1-(3-chloro-2-cycloheptenyl)-4 - (4 - hydroxyphenyl)-4-ethoxycarbonyl-piperidine and its hydrochloride, M.P. 199° C., were prepared from 4-(4-hydroxyphenyl)-4-ethoxycarbonyl-piperidine hydrochloride and 1-chloro-3-bromo-cycloheptene. The yield of hydrochloride was 29% of theory.

EXAMPLE 23

Using a procedure analogous to that described in Example 1, 1-(3-chloro-2-cyclo-octenyl)-4 - (3 - hydroxyphenyl)-4-methoxycarbonyl-piperidine and its hydrochloride, M.P. 214° C., was prepared from 4-(3-hydroxyphenyl)-4-methoxycarbonyl-piperidine hydrochloride and 1-chloro-3-bromo-cyclo-octene. The yield of hydrochloride was 44% of theory.

EXAMPLE 24

Using a procedure analogous to that described in Example 1, 1-(3-chloro-2-cyclo-octenyl)-4 - (3 - hydroxyphenyl)-4-ethoxycarbonyl-piperidine and its hydrochloride, M.P. 169° C., were prepared from 4-(3-hydroxyphenyl)-4-ethoxycarbonyl-piperidine hydrochloride and 1-chloro-3-bromo-cyclo-octene. The yield of hydrochloride was 31% of theory.

The compounds according to the present invention, that is, those embraced by Formula I and their non-toxic, pharmacologically acceptable acid addition salts, have useful pharmacodynamic properties. More particularly, they exhibit morphine-antagonistic properties in mice and rhesus monkeys and analgesic properties in mice. In other words, the compounds of the present invention are morphine antagonists with analgesic activity, that is, compounds which are effective analgesics in higher warm-blooded animals without physical dependence capacity (addiction liability).

For pharmaceutical purposes the compounds of the instant application are administered to warm-blooded animals perorally, parenterally or by the rectal route as active ingredients in customary dosage unit form consisting essentially of an inert pharmaceutical carrier and one dosage unit of the active ingredient, such as tablets, coated pills, emulsions, suspensions, solutions, capsules, wafers, suppositories or the like. In addition to a piperidine derivative of this invention, the dosage unit compositions may also comprise as an active ingredient an addiction-producing narcoatic analgesic, such as morphine, pethidine, ketobemidone or the like. One dosage unit of the compounds according to the present invention is from 0.166 to 5.0 mgm./kg., preferably 0.83 to 2.5 mgm./kg. body weight.

The following examples illustrate a few dosage unit compositions comprising a compound of the present inven-

EXAMPLE 25

Hypodermic solution

The solution was compounded from the following ingredients:

| | Parts by vol. |
|---|---|
| 1 - (3 - chloro - 2-cyclohexenyl)-4-(3-hydroxyphenyl) - 4 - methoxycarbonyl - piperidine - methanesulfonate | 100 |
| Dextrose | 10 |
| Distilled water q.s. ad. | 2000 |

Compounding procedure

The piperidine compound and the dextrose were dissolved in the distilled water, the solution was filtered until free from suspended particles, and the filtrate was filled into 2 cc.-ampules, which were thereafter sterilized and sealed. Each ampule contained 100 mgm. of the piperidine compound, and when the contents of one ampule were administered intravenously to a warm-blooded animal of about 60 kg. body weight in need of such treatment, very good analgesic effects were obtained.

EXAMPLE 26

Tablets

The tablet composition was compounded from the following ingredients:

| | Parts |
|---|---|
| 1 - (3 - chloro - 2 - cyclohexenyl)-4-(3-hydroxyphenyl) - 2 - methoxycarbonyl - piperidine hydrochloride | 50 |
| Corn starch | 30 |
| Lactose | 20 |
| Colloidal silicic acid | 2 |
| Gelatin | 3 |
| Magnesium stearate | 2 |
| Talcum | 3 |
| Total | 110 |

Compounding procedure

The piperidine compound, the corn starch, the lactose and the silicic acid were thoroughly admixed with each other, the mixture was moistened with a 10% aqueous solution of the gelatin, the moist mass was forced through a 1.5 mm.-mesh screen, and the resulting granulate was dried. The dry granulate was admixed with the magnesium stearate and the talcum, and the mixture was pressed into 100 mgm. tablets. One tablet contained 50 mgm. of the active ingredient and, when administered perorally to a warm-blooded animal of about 60 kg. body weight in need of such treatment, produced very good analegsic effects.

EXAMPLE 27

Drop solution

The solution was compounded from the following ingredients:

| | Parts by vol. |
|---|---|
| 1 - (3 - chloro - 2 - cyclohexenyl)-4-(3-hydroxyphenyl) - 4 - methoxycarbonyl - piperidine - methanesulfonate | 10 |
| p-Hydroxy-benzoic acid methyl ester | 0.07 |
| p-Hydroxy-benzoic acid propyl ester | 0.03 |
| Ethanol | 20 |
| Polyethyleneglycol 400 | 20 |
| Distilled water q.s. ad. | 100 |

Compounding procedure

The various ingredients were dissolved in the distilled water, and the solution was filtered until clear. 1 cc. (about 5 drops) of solution contained 100 mgm. of the active ingredient and, when administered perorally to a warm-blooded animal of about 60 kg. body weight in need of such treatment, produced very good analgesic effects.

EXAMPLE 28

Suppositories

The suppository composition was compounded from the following ingredients:

| | Parts |
|---|---|
| 1 - (3 - chloro - 2 - cyclopentyl)-4-(3-hydroxyphenyl) - 4 - methoxycarbonyl - piperidine hydrochloride | 150 |
| Lactose | 150 |
| Cocoa butter | 1400 |
| Total | 1700 |

Compounding procedure

The cocoa butter was melted, cooled to about 37° C., the finely pulverized piperidine compound and the lactose were stirred in, and the mixture was homogenized. The homogeneous composition was poured into cooled suppository molds, each holding 1700 mgm. of the composition. One suppository contained 150 mgm. of the active ingredient and, when administered by the rectal route to a warm-blooded animal of about 60 kg. body weight in need of such treatment, produced very good analgesic effects.

Although the above dosage unit composition examples illustrate only two compounds according to the invention as active ingredient components, it should be understood that any other compound of the Formula I or a non-toxic, pharmacologically acceptable acid addition salt thereof may be substituted for the particular active ingredient in Examples 25 through 28. Moreover, the amount of active ingredient in each of these examples may be varied to achieve the dosage unit range set forth above, and the amounts and nature of the inert carrier components may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A pharmacodynamic composition in dosage unit form, consisting essentially of an inert pharmaceutical carrier and an effective analgesic amount of a compound of the formula

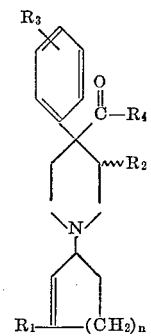

wherein $R_1$ is hydrogen, chlorine or bromine,
$R_2$ is hydrogen, α-methyl or β-methyl,
$R_3$ is m-hydroxy, p-hydroxy, m-methoxy or p-methoxy,
$R_4$ is methoxy, ethoxy or propoxy, and
$n$ is an integer from 1 to 4, inclusive, or a non-toxic, pharmacologically acceptable acid addition salt thereof.

2. The method of producing morphine-antagonistic effects and increasing the pain threshold in warm-blooded animals, which comprises administering to said animals an effective analgesic amount of a compound of the formula

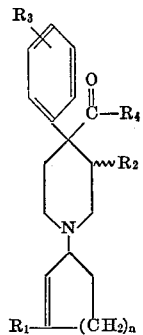

wherein $R_1$ is hydrogen, chlorine or bromine,
$R_2$ is hydrogen, α-methyl or β-methyl,
$R_3$ is m-hydroxy, p-hydroxy, m-methoxy or p-methoxy,
$R_4$ is methoxy, ethoxy or propoxy, and
$n$ is an integer from 1 to 4, inclusive, or a non-toxic, pharmacologically acceptable acid addition salt thereof.

References Cited

UNITED STATES PATENTS 3,217,010  11/1965  Kuhnis et al. _____ 260—294.3

ALBERT T. MEYERS, Primary Examiner

J. D. GOLDBERG, Assistant Examiner 157.091-1 WGW

PO-1050
(5/69)

UNITED STATES PATENT OFFICE
CERTIFICATE OF CORRECTION

Patent No. 3,536,814          Dated October 27, 1970

Inventor(s) Herbert Merz, Hans-Detlef Schroeder, Adolf Langbein and Karl Zeile

It is certified that error appears in the above-identified patent and that said Letters Patent are hereby corrected as shown below:

Col. 2, line 43, "143" should read --1433--.

Col. 3, line 67, "cyclohexyl" should read --cyclohexenyl--.

Col. 4, line 24, "3β" should read --3α--.

Signed and sealed this 23rd day of March 1971.

(SEAL)
Attest:

EDWARD M. FLETCHER, JR.          WILLIAM E. SCHUYLER, JR.
Attesting Officer          Commissioner of Patents